US012232578B2

(12) United States Patent
McLeod et al.

(10) Patent No.: US 12,232,578 B2
(45) Date of Patent: Feb. 25, 2025

(54) QUICK RELEASE BUCKLE AND HARNESS COMPRISING THE SAME

(71) Applicant: 3M INNOVATIVE PROPERTIES COMPANY, St. Paul, MN (US)

(72) Inventors: Christopher S. McLeod, Lake Elmo, MN (US); Michael T. Weiss, Hastings, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 33 days.

(21) Appl. No.: 17/998,968

(22) PCT Filed: Jun. 1, 2021

(86) PCT No.: PCT/IB2021/054802
§ 371 (c)(1),
(2) Date: Nov. 16, 2022

(87) PCT Pub. No.: WO2021/255564
PCT Pub. Date: Dec. 23, 2021

(65) Prior Publication Data

US 2023/0172320 A1 Jun. 8, 2023

Related U.S. Application Data

(60) Provisional application No. 63/039,613, filed on Jun. 16, 2020.

(51) Int. Cl.
*A44B 11/25* (2006.01)
*A62B 35/00* (2006.01)

(52) U.S. Cl.
CPC ...... *A44B 11/2519* (2013.01); *A62B 35/0025* (2013.01)

(58) Field of Classification Search
CPC ........................ A62B 35/0025; A44B 11/2519
See application file for complete search history.

(56) References Cited

U.S. PATENT DOCUMENTS

| | | | |
|---|---|---|---|
| D621,743 S | 8/2010 | Hortnagl | |
| D621,744 S | 8/2010 | Hortnagl | |

(Continued)

FOREIGN PATENT DOCUMENTS

| | | |
|---|---|---|
| EP | 2191739 A2 | 6/2010 |
| KR | 101860271 B1 | 5/2018 |
| WO | 1990004934 A1 | 5/1990 |

OTHER PUBLICATIONS

"Patented AustriAlpin COBRA@ quick releases", Product information from AustriAlpin inc. (date unknown but believed to be prior to the date of the filing of the present application), retrieved from the internet on Jan. 6, 2023, URL <https://austrialpin.net/product-information/cobra-quick-releases/>_3 Pages.

(Continued)

*Primary Examiner* — Robert Sandy
*Assistant Examiner* — Michael S Lee
(74) *Attorney, Agent, or Firm* — Kenneth B. Wood

(57) ABSTRACT

A quick release buckle includes a housing defining a first opening therethrough and includes an engaging surface disposed adjacent to the first opening. A webbing is received through the first opening of the housing. A first pawl and a second pawl are pivotally mounted to the housing. A catch is at least partially received between the first pawl and the second pawl. A first pawl biasing member and a second pawl biasing member are engaged with the first pawl and the second pawl, respectively, and are configured to bias the first pawl and the second pawl into engagement with the catch. A bar is slidably received within the housing and extends across the first opening. A first bar biasing member and a second bar biasing member are configured to bias the bar (Continued)

toward the engaging surface, such that the webbing is gripped between the bar and the engaging surface.

10 Claims, 15 Drawing Sheets

(56) References Cited

U.S. PATENT DOCUMENTS

| | | | | |
|---|---|---|---|---|
| 8,181,319 | B2 | 5/2012 | Johnson et al. | |
| D738,255 | S | 9/2015 | Hortnagl | |
| 9,993,048 | B2 | 6/2018 | Casebolt | |
| 10,413,022 | B2 | 9/2019 | Porto et al. | |
| 2010/0071173 | A1 | 3/2010 | Hortnagl | |
| 2010/0122437 | A1 | 5/2010 | Hörtnagl | |
| 2010/0243373 | A1* | 9/2010 | Johnson | A44B 11/2557 24/171 |
| 2011/0239413 | A1* | 10/2011 | Milbright | A44B 11/253 24/191 |
| 2013/0192033 | A1 | 8/2013 | Hortnagl | |
| 2013/0291344 | A1 | 11/2013 | Hortnagl | |
| 2014/0082902 | A1 | 3/2014 | Hortnagl | |
| 2014/0215773 | A1 | 8/2014 | Hortnagl | |
| 2014/0298630 | A1 | 10/2014 | Hortnagl | |
| 2014/0304955 | A1 | 10/2014 | Hortnagl | |
| 2014/0325804 | A1 | 11/2014 | Hortnagl | |
| 2015/0067989 | A1 | 3/2015 | Hortnagl | |
| 2015/0074958 | A1* | 3/2015 | Hung | A44B 11/2511 24/594.1 |
| 2017/0196315 | A1* | 7/2017 | Hung | A44B 11/2519 |
| 2019/0380453 | A1 | 12/2019 | Hortnagl | |
| 2020/0008537 | A1 | 1/2020 | Sepe et al. | |

OTHER PUBLICATIONS

International Search Report for PCT Application No. PCT/IB2021/054802, mailed on Sep. 7, 2021, 3 pages.

* cited by examiner

QUICK RELEASE BUCKLE AND HARNESS COMPRISING THE SAME

TECHNICAL FIELD

The present disclosure relates generally to a buckle, and in particular, to a quick release buckle and a harness comprising the same.

BACKGROUND

Buckles are widely used for coupling two straps or webbings together, e.g., for use in safety harnesses and the like. A safety harness may require multiple adjustment points to ensure a proper fit for users of different sizes and proportions. The multiple adjustment points may be further designed to aid in a function of the safety harness during a fall event. Using non-locking buckles in the safety harness may cause unintentional loosening of the safety harness over time, and thereby result in a potentially dangerous situation if the fall event takes place when the safety harness is loose.

SUMMARY

In one aspect, the present disclosure provides a quick release buckle. The quick release buckle includes a housing defining a first opening therethrough and comprising an engaging surface disposed adjacent to the first opening. The quick release buckle further includes a webbing received through the first opening of the housing. The quick release buckle further includes a first pawl pivotally mounted to the housing. The quick release buckle further includes a second pawl pivotally mounted to the housing. The quick release buckle further includes a catch at least partially received between the first pawl and the second pawl. The quick release buckle further includes a first pawl biasing member engaged with the first pawl and configured to bias the first pawl into engagement with the catch. The quick release buckle further includes a second pawl biasing member engaged with the second pawl and configured to bias the second pawl into engagement with the catch. The quick release buckle further includes a bar slidably received within the housing and extending across the first opening. The quick release buckle further includes a first bar biasing member engaged with the bar and a second bar biasing member engaged with the bar. The first bar biasing member and the second bar biasing member are configured to bias the bar toward the engaging surface, such that the webbing is gripped between the bar and the engaging surface.

In another aspect, the present disclosure provides a quick release buckle. The quick release buckle includes a housing defining a first opening therethrough. The quick release buckle further includes a first pawl pivotally mounted to the housing. The quick release buckle further includes a second pawl pivotally mounted to the housing. The quick release buckle further includes a catch at least partially received between the first pawl and the second pawl. The quick release buckle further includes a first biasing member engaged with the first pawl and configured to bias the first pawl into engagement with the catch. The quick release buckle further includes a second biasing member engaged with the second pawl and configured to bias the second pawl into engagement with the catch. The quick release buckle further includes a webbing received through the first opening of the housing. The quick release buckle further includes a bar disposed within the housing and extending across the first opening. The quick release buckle further includes a lever at least partially received within the housing and movable between a first position and a second position. The lever includes an integral spring portion engaged with the housing and configured to bias the lever toward the first position, such that the webbing is gripped between the lever and the bar in the first position of lever and the webbing is allowed to move relative to the bar in the second position of the lever.

In another aspect, the present disclosure provides a harness. The harness includes a webbing configured to engage portions of a user's body. The harness further includes a safety quick release buckle including a housing defining a first opening therethrough and comprising an engaging surface disposed adjacent to the first opening. The quick release buckle further includes a webbing received through the first opening of the housing. The quick release buckle further includes a first pawl pivotally mounted to the housing. The quick release buckle further includes a second pawl pivotally mounted to the housing. The quick release buckle further includes a catch at least partially received between the first pawl and the second pawl. The quick release buckle further includes a first pawl biasing member engaged with the first pawl and configured to bias the first pawl into engagement with the catch. The quick release buckle further includes a second pawl biasing member engaged with the second pawl and configured to bias the second pawl into engagement with the catch. The quick release buckle further includes a bar slidably received within the housing and extending across the first opening. The quick release buckle further includes a first bar biasing member engaged with the bar and a second bar biasing member engaged with the bar. The first bar biasing member and the second bar biasing member are configured to bias the bar toward the engaging surface, such that the webbing is gripped between the bar and the engaging surface.

BRIEF DESCRIPTION OF THE DRAWINGS

Exemplary embodiments disclosed herein may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

The present disclosure relates to a quick release buckle. The quick release buckle may be used in safety harnesses, belts, safety jackets, life vests, and other equipment which require a buckle.

The quick release buckle includes a housing defining a first opening therethrough and comprising an engaging surface disposed adjacent to the first opening. The quick release buckle further includes a webbing received through the first opening of the housing. The quick release buckle further includes a first pawl pivotally mounted to the housing. The quick release buckle further includes a second pawl pivotally mounted to the housing. The quick release buckle further includes a catch at least partially received between the first pawl and the second pawl. The quick release buckle further includes a first pawl biasing member engaged with the first pawl and configured to bias the first pawl into engagement with the catch. The quick release buckle further includes a second pawl biasing member engaged with the second pawl and configured to bias the second pawl into engagement with the catch. The quick release buckle further includes a bar slidably received within the housing and extending across the first opening. The quick release buckle further includes a first bar biasing member engaged with the bar and a second bar biasing member engaged with the bar. The first bar biasing member and the second bar biasing member are configured to bias the bar toward the engaging surface, such that the webbing is gripped between the bar and the engaging surface.

The quick release buckle may automatically lock the webbing at a desired position or length selected by a user, thereby reducing accidental loosening of the webbing of a harness. In other words, the quick release buckle may prevent accidental or undesired adjustment of the webbing. This may provide greater security to the user during a fall event. The quick release buckle may also allow quick adjustment of a length of the webbing by the user.

Figure 1:
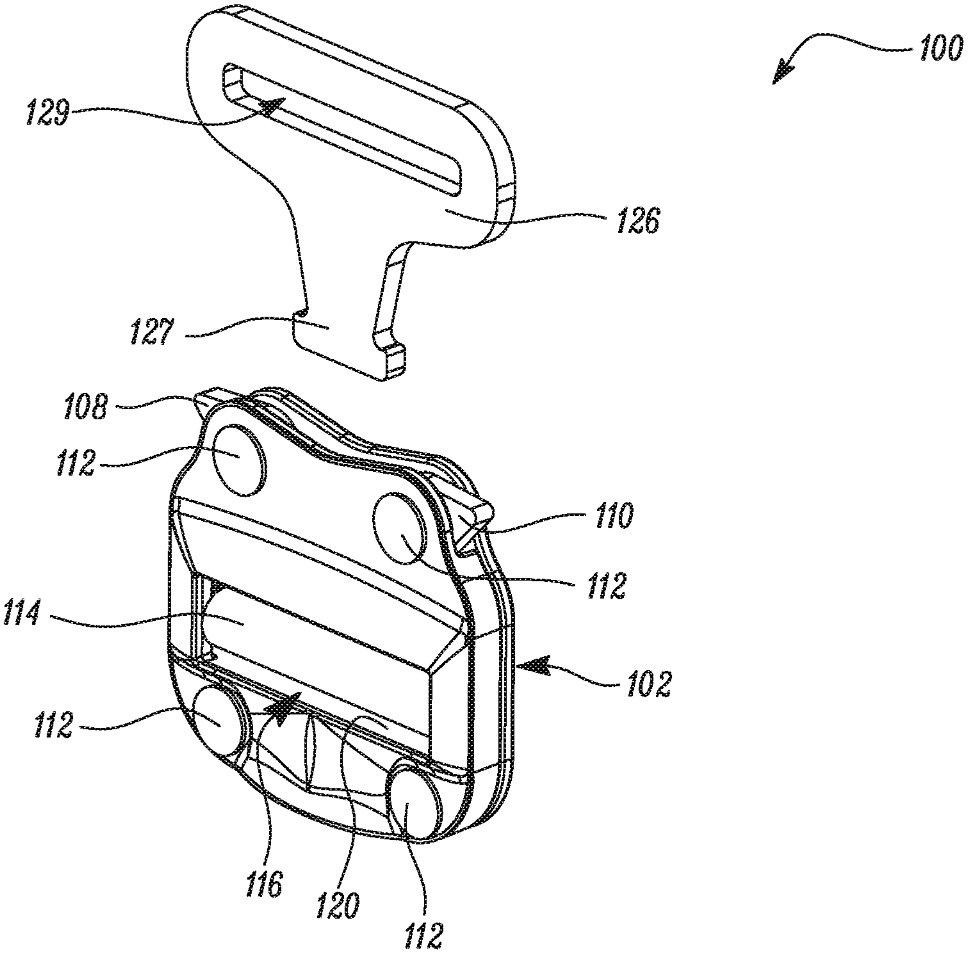
FIG. 1 is a schematic front perspective view of a quick release buckle according to one embodiment of the present disclosure.

Referring now to the Figures, FIG. 1 illustrates a quick release buckle 100 including a housing 102, a first pawl 108, a second pawl 110, a bar 114, mechanical fasteners 112, and a catch 126. The first pawl 108 is pivotally mounted to the housing 102. Furthermore, the second pawl 110 is pivotally mounted to the housing 102. The first pawl 108 and the second pawl 110 may be pivotally mounted to the housing 102 by the respective mechanical fasteners 112. The catch 126 is at least partially received between the first pawl 108 and the second pawl 110. Specifically, the catch 126 may have an engaging portion 127 which is received between the first pawl 108 and the second pawl 110. The catch 126 may be coupled to a catch webbing (not shown) that is received through a slot 129 of the catch 126. The housing 102 defines a first opening 116 therethrough and includes an engaging surface 120 disposed adjacent to the first opening 116. The bar 114 is slidably received within the housing 102 and extends across the first opening 116. A webbing 124 (shown in FIGS. 6A and 6B) is received through the first opening 116 of the housing 102. In some embodiments, the bar 114 may be knurled to increase its grip on the webbing 124. The webbing 124 may be disposed at least partially around the bar 114.

The housing 102 may be formed by two or more parts. The two or more parts of the housing 102 may be fixedly connected using the mechanical fasteners 112. In the illustrated embodiment, the mechanical fasteners 112 are rivets. However, the mechanical fasteners 112 may be, for example, screws, bolts, and the like.

Figure 2:
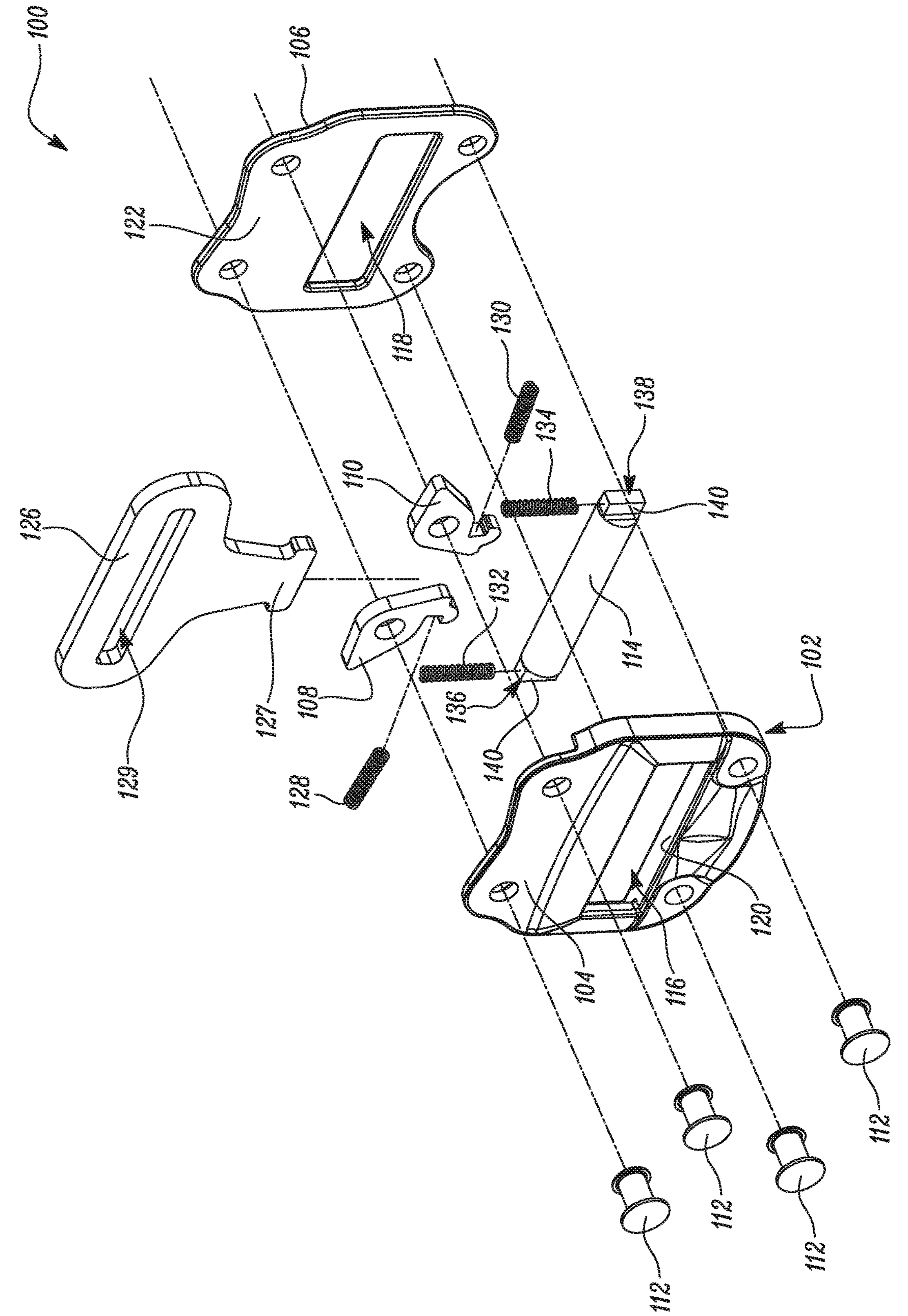
FIG. 2 is a schematic exploded front perspective view of the quick release buckle.

FIG. 2 illustrates an exploded front perspective view of the quick release buckle 100. Referring to FIGS. 1 and 2, the housing 102 includes a first housing part 104 and a second housing part 106. In other words, the first housing part 104 and the second housing part 106 may together form the housing 102. Hereinafter, the first housing part 104 and the second housing part 106 may be collectively referred to as the housing 102. The first housing part 104 defines the first opening 116 therethrough and the second housing part 106 is connected to the first housing part 104. The first housing part 104 and the second housing part 106 may be fixedly connected using the mechanical fasteners 112. The second housing part 106 defines a second opening 118 therethrough aligned with the first opening 116, such that the webbing 124 (shown in FIGS. 6A and 6B) is received through the second opening 118. The second housing part 106 further includes a cover surface 122. In some embodiments, at least a portion of the bar 114 may extend through the first opening 116 and the second opening 118 of the housing 102.

The quick release buckle 100 further includes a pair of pawl biasing members, namely a first pawl biasing member 128 and a second pawl biasing member 130. The first pawl biasing member 128 is engaged with the first pawl 108 and is configured to bias the first pawl 108 into engagement with the catch 126. Furthermore, the second pawl biasing member 130 is engaged with the second pawl 110 and is configured to bias the second pawl 110 into engagement with the catch 126. In the illustrated embodiment, each of the first pawl biasing member 128 and the second pawl biasing member 130 is a coil spring. However, the first pawl biasing member 128 and the second pawl biasing member 130 may be any suitable biasing member, for example, magnets.

The quick release buckle 100 further includes a first bar biasing member 132 engaged with the bar 114 and a second bar biasing member 134 engaged with the bar 114. The first bar biasing member 132 and the second bar biasing member 134 are configured to bias the bar 114 toward the engaging surface 120, such that the webbing 124 (shown in FIGS. 6A and 6B) is gripped between the bar 114 and the engaging surface 120. In the illustrated embodiment, each of the first bar biasing member 132 and the second bar biasing member 134 is a coil spring.

Figure 3:
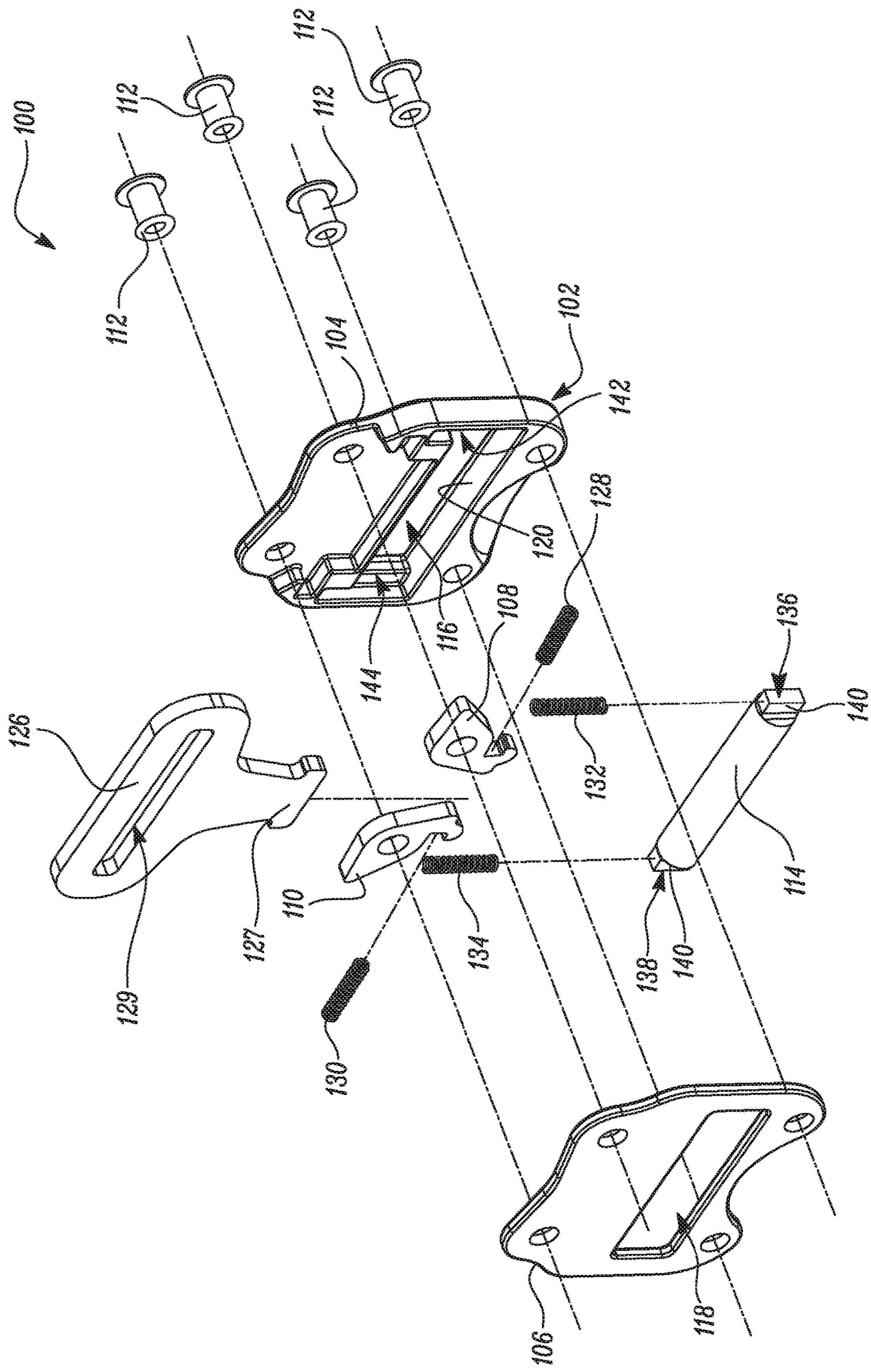
FIG. 3 is a schematic exploded rear perspective view of the quick release buckle.

FIG. 3 illustrates an exploded rear perspective view of the quick release buckle 100. Referring to FIGS. 2 and 3, the first housing part 104 may include a structure to receive various components of the quick release buckle 100, and the second housing part 106 may function as a cover to the first housing part 104. As illustrated, the first pawl 108 and the second pawl 110 may be pivotally coupled to the mechanical fasteners 112, and received in the first housing part 104. Furthermore, the first pawl biasing member 128 and the second pawl biasing member 130 may also be received in the first housing part 104.

In the illustrated embodiment, the bar 114 includes a first extension 136 and a second extension 138 at opposing ends of the bar 114. The bar 114 may have a substantially cylindrical main portion with the first and second extensions 136, 138 at opposing ends of the cylindrical main portion. Each of the first extension 136 and the second extension 138 is configured to slide relative to the housing 102. The first bar biasing member 132 engages the first extension 136 and the second bar biasing member 134 engages the second extension 138. Each of the first extension 136 and the second extension 138 has a substantially planar surface 140 configured to engage and slide relative to the housing 102. In the illustrated embodiment, a shape of each of the first extension 136 and the second extension 138 is generally rectangular, however, the shapes of the first extension 136 and the second extension 138 may include any suitable planar shape, for example, curved, polygonal, etc.

Figure 4:
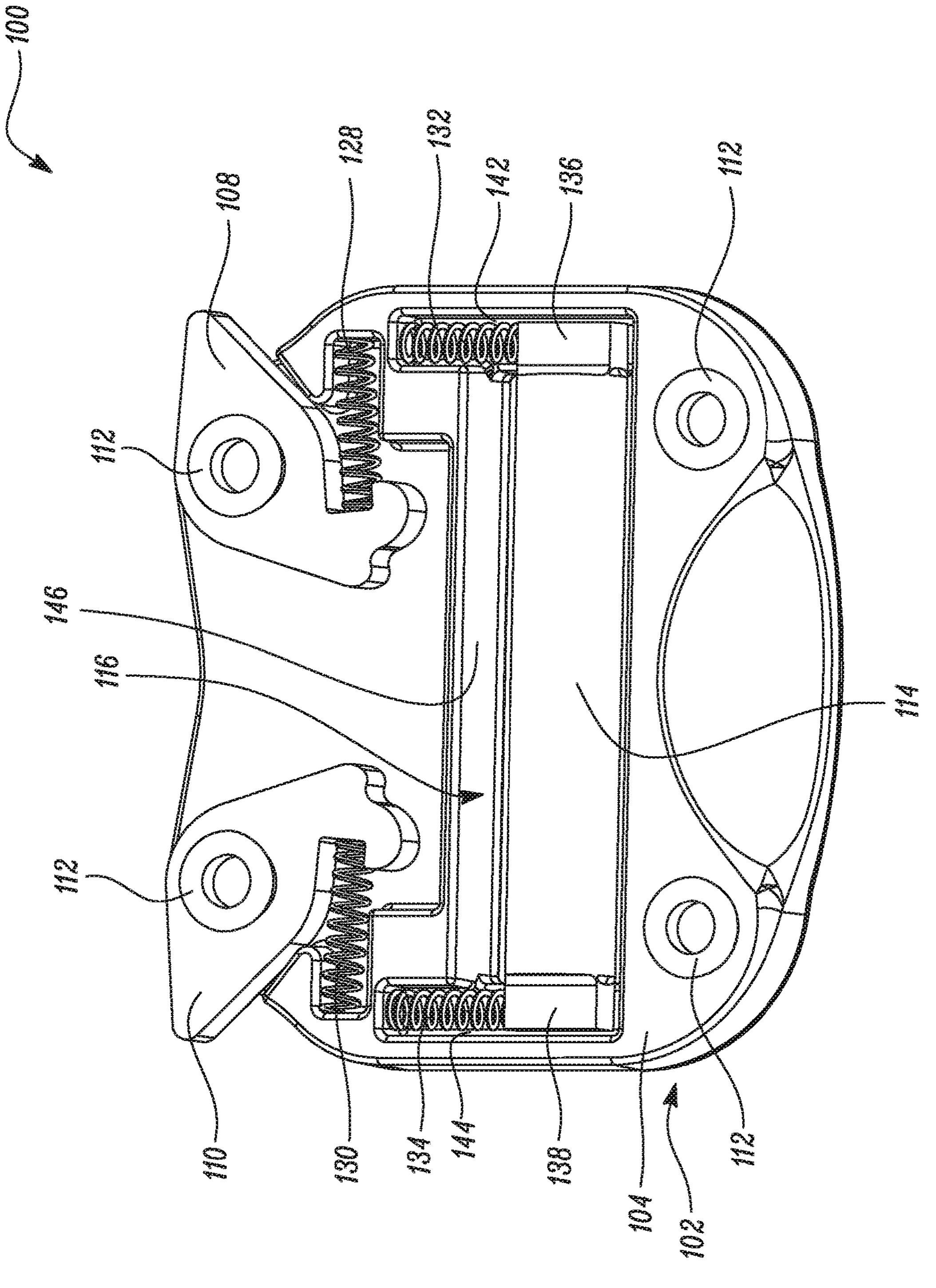
FIG. 4 is a schematic front view of a first housing part of the quick release buckle with a second housing part not shown.

FIG. 4 illustrates the quick release buckle 100 with the second housing part 106 not shown. As illustrated, the housing 102 defines a first groove 142 and a second groove 144 opposing the first groove 142. The first extension 136 is configured to slide along the first groove 142 and the second extension 138 is configured to slide along the second groove 144. As illustrated, the first opening 116 is disposed between the first groove 142 and the second groove 144. Furthermore, the first bar biasing member 132 is at least partially received in the first groove 142 and the second bar biasing member 134 is at least partially received in the second groove 144. The first groove 142 and the second groove 144 are described in detail with reference to FIGS. 5A and 5B.

Figure 5A:
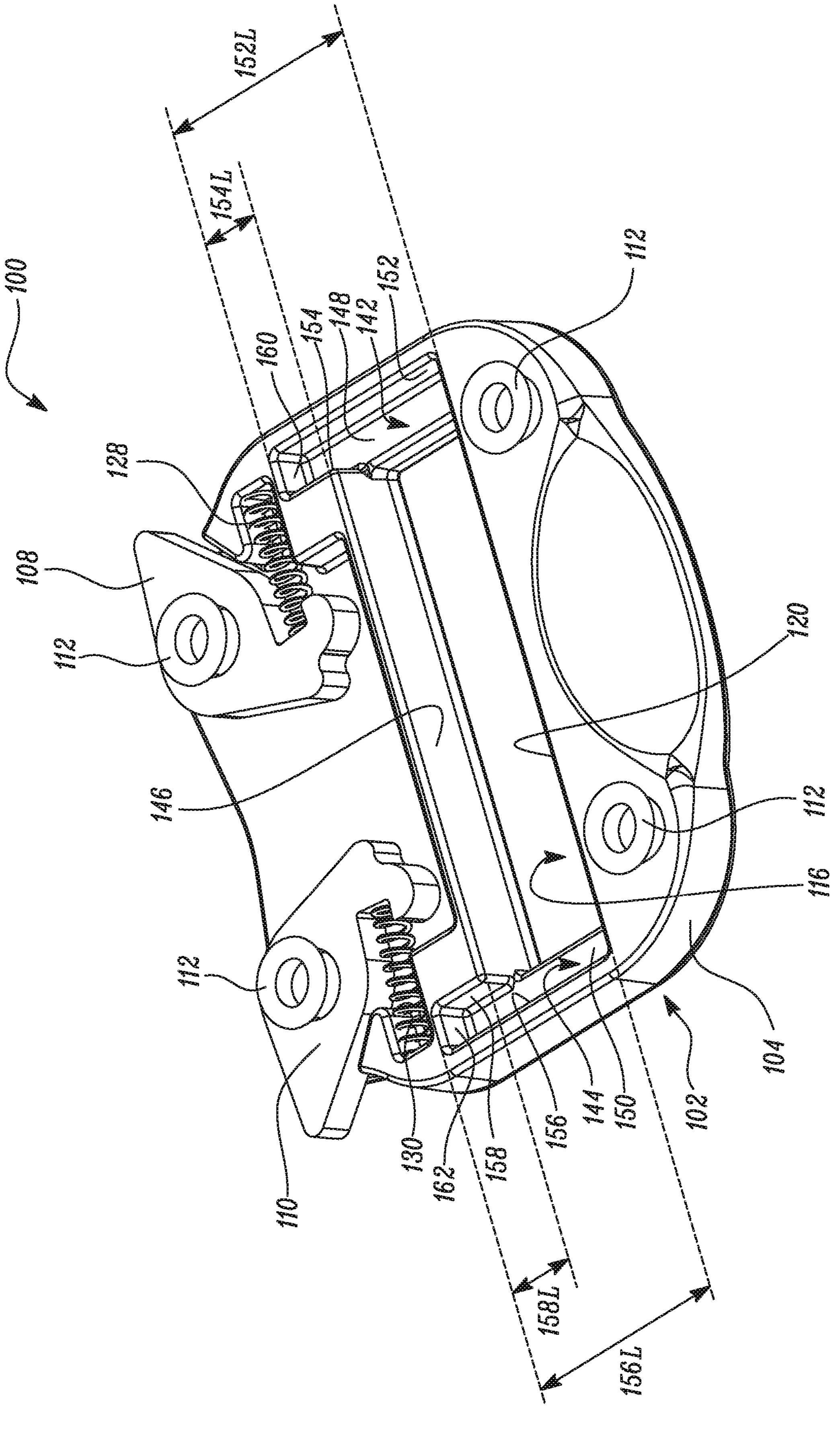
FIGS. 5A and 5B are schematic perspective views of the first housing part of the quick release buckle with various components not shown.
Figure 5B:
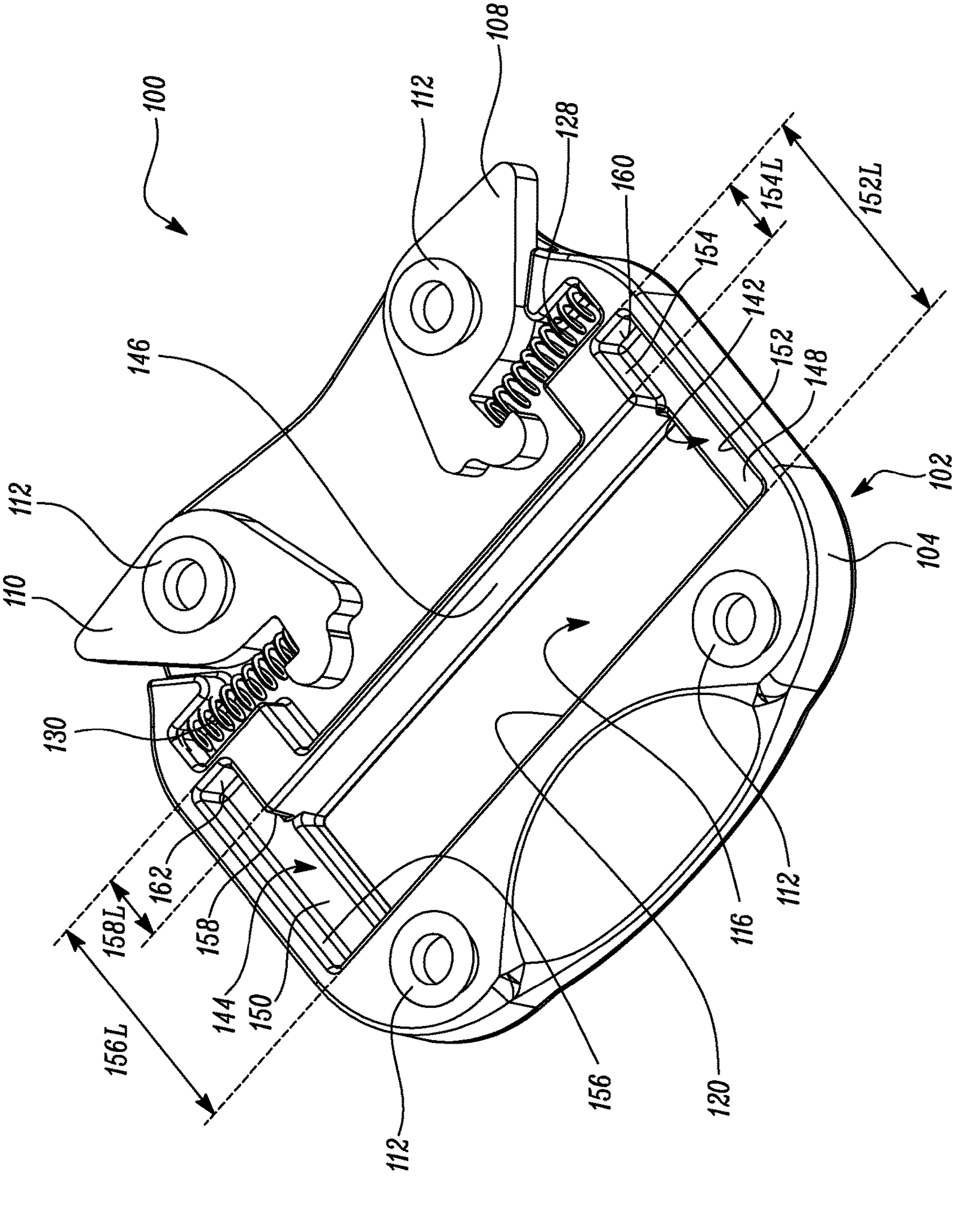

FIGS. 5A and 5B, perspective views of the quick release buckle 100 are illustrated with the second housing part 106 not shown. The bar 114, the first bar biasing member 132 and the second bar biasing member 134 are also not shown for illustrative purpose. Referring to FIGS. 1-4, 5A and 5B, the housing 102 includes a first support surface 148, a first lateral surface 152 extending from the first support surface 148, a second lateral surface 154 extending from the first support surface 148 and opposite to the first lateral surface 152, and a first end surface 160 extending from the first support surface 148 and connected to the first lateral surface 152 and the second lateral surface 154. The first support surface 148, the first lateral surface 152, the second lateral surface 154 and the first end surface 160 at least partially define the first groove 142. A length 152L (see FIGS. 5A and 5B) of the first lateral surface 152 is greater than a length 154L of the second lateral surface 154, such that the first support surface 148 slidably receives the first extension 136 (see FIG. 4) of the bar 114 thereon. Specifically, a difference in the lengths 152L, 154L between the first and second lateral surfaces 152, 154 may create an opening or a cutout in the first groove 142, such that the first extension 136 can be slidably supported by the first support surface 148. The first bar biasing member 132 engages with the first end surface 160 and is at least partially received between the first lateral surface 152 and the second lateral surface 154. This may retain the first bar biasing member 132 within the first groove 142. In some cases, ends (not shown) of the first bar biasing member 132 may be coupled to the first end surface 160 and the first extension 136.

Furthermore, the housing 102 includes a second support surface 150, a third lateral surface 156 extending from the second support surface 150, a fourth lateral surface 158 extending from the second support surface 150 and opposite to the third lateral surface 156, and a second end surface 162 extending from the second support surface 150 and connected to the third lateral surface 156 and the fourth lateral surface 158. The second support surface 150, the third lateral surface 156, the fourth lateral surface 158 and the second end surface 162 at least partially define the second groove 144. A length 156L of the third lateral surface 156 (see FIGS. 5B and 5B) is greater than a length 158L of the fourth lateral surface 158, such that the bar 114 (see FIG. 4) is disposed between the first lateral surface 152 and the third lateral surface 156 and the second support surface 150 slidably receives the second extension 138 of the bar 114 thereon. Specifically, a difference in the lengths 156L, 158L between the third and fourth lateral surfaces 156, 158 may create an opening or a cutout in the second groove 144, such that the second extension 138 can be slidably supported by the second support surface 150. Further, the second bar biasing member 134 engages with the second end surface 162 and is at least partially received between the third lateral surface 156 and the fourth lateral surface 158. This may retain the second bar biasing member 134 within the second groove 144. In some cases, ends (not shown) of the second bar biasing member 134 may be coupled to the second end surface 162 and the second extension 138.

In the illustrated embodiment, each of the first support surface 148, the second support surface 150, the first lateral surface 152, second lateral surface 154, the third lateral surface 156, the fourth lateral surface 158, the first end surface 160, the second end surface 162 are substantially planar with rounded or chamfered edges and surface interfaces. Further, the first groove 142 and the second groove 144 may be substantially U-shaped at least partly along their respective lengths. However, in other embodiments, one or more of the first support surface 148, the second support surface 150, the first lateral surface 152, second lateral surface 154, the third lateral surface 156, the fourth lateral surface 158, the first end surface 160, the second end surface 162 may be curved as per application requirements.

The engaging surface 120 is connected to and extends between the first lateral surface 152 and the third lateral surface 156. The cover surface 122 (see FIG. 2) is disposed opposite to each of the first support surface 148 and the second support surface 150 and at least partially covers the first groove 142 and the second groove 144. The housing 102 further includes a stop surface 146 opposite to the engaging surface 120. The stop surface 146 is connected to and extends between the second lateral surface 154 and the fourth lateral surface 158. The first opening 116 is further disposed between the engaging surface 120 and the stop surface 146.

In the illustrated embodiment, each of the engaging surface 120 and the stop surface 146 are substantially planar with rounded or chamfered edges and surface interfaces. However, in other embodiments, one or more of the engaging surface 120 and the stop surface 146 may be curved as per application requirements. Further, the cover surface 122 may be planar or curved.

As discussed above, the housing 102 includes the first housing part 104 and the second housing part 106. The first housing part 104 includes the first support surface 148, the second support surface 150, the first lateral surface 152, the second lateral surface 154, the third lateral surface 156, the fourth lateral surface 158, the first end surface 160, the second end surface 162, the engaging surface 120, and the stop surface 146. The second housing part 106 (see FIGS. 2 and 3) includes the cover surface 122 (see FIG. 2) disposed opposite to each of the first support surface 148 and the second support surface 150 and at least partially covering the first groove 142 and the second groove 144.

Figure 6B:
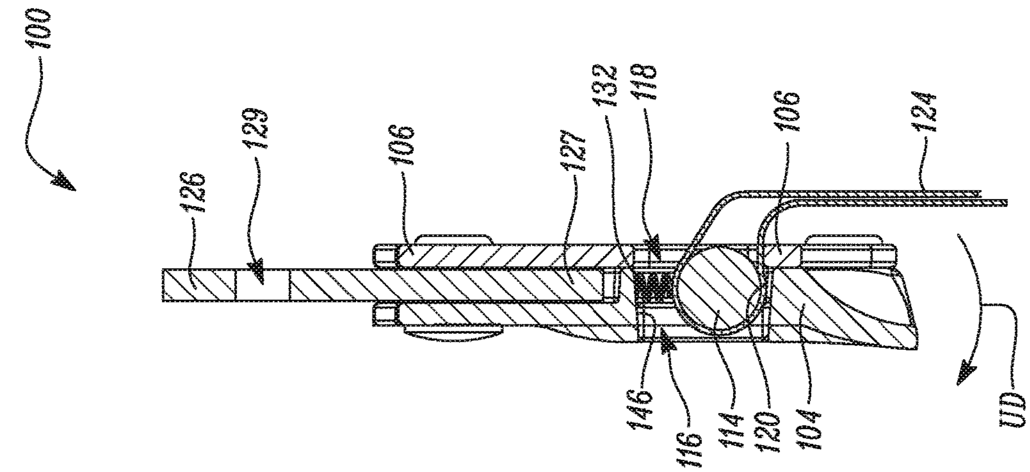
FIG. 6B is a schematic sectional side view of the quick release buckle.
Figure 6A:
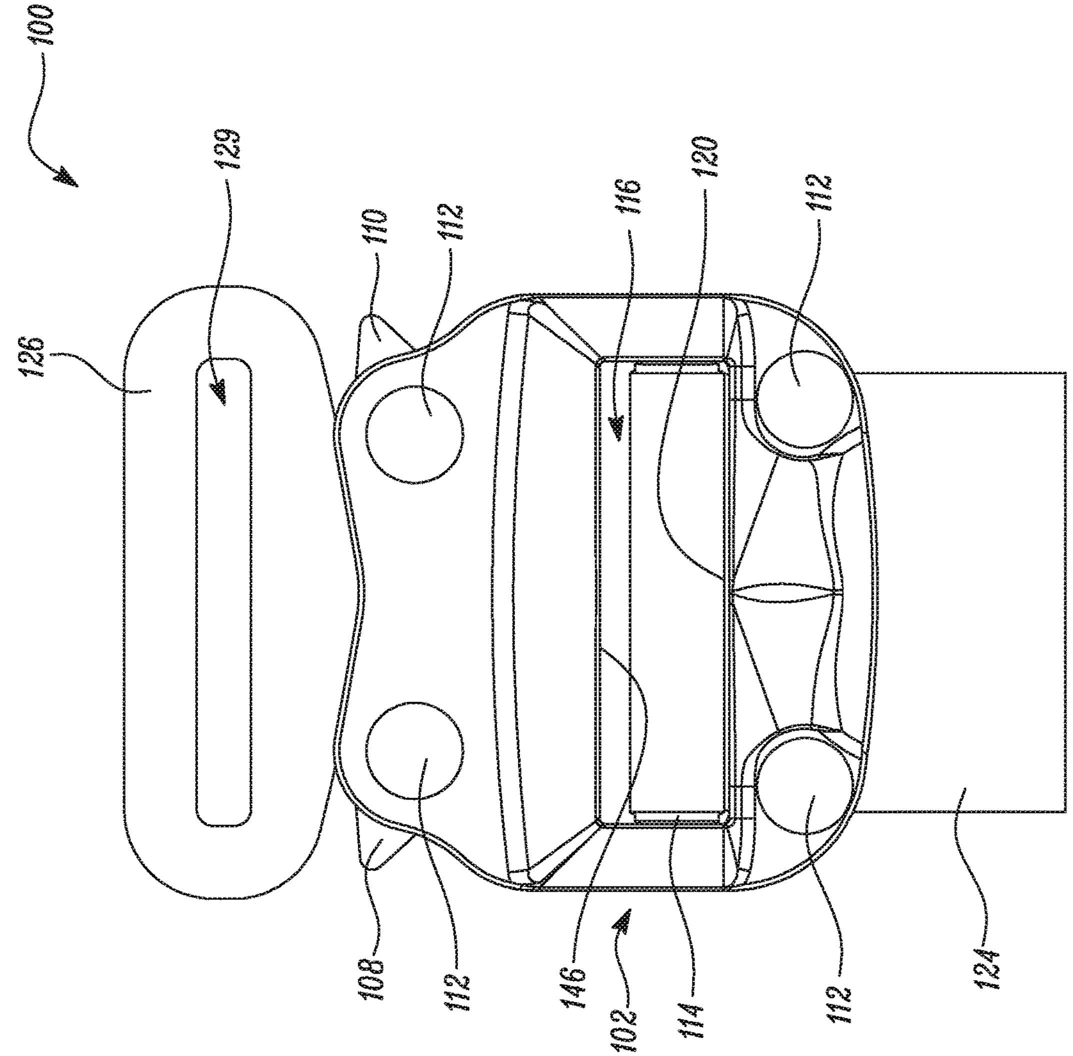
FIG. 6A is a schematic front view of the quick release buckle.

Referring to FIGS. 6A and 6B, assembled views of the quick release buckle 100 with the webbing 124 are illustrated. The webbing 124 is partially shown in FIGS. 6A and 6B. As illustrated, the webbing 124 is received through the first opening 116 of the housing 102. Further, the webbing 124 is gripped between the bar 114 and the engaging surface 120. The catch 126 is at least partially received between the first pawl 108 and the second pawl 110. Specifically, the engaging portion 127 of the catch 126 may be received between the first pawl 108 and the second pawl 110.

As illustrated in FIG. 6B, the housing 102 includes the first housing part 104 defining the first opening 116 therethrough and the second housing part 106 connected to the first housing part 104 and defining the second opening 118 therethrough. The second opening 118 is aligned with the first opening 116, such that the webbing 124 is received through the second opening 118.

Referring to FIGS. 4, 6A and 6B, during use, a user may pull the quick release buckle 100 in an unlocking direction UD. By pulling the quick release buckle 100 in the unlocking direction UD, the bar 114 may slide towards the stop surface 146, opposite the engaging surface 120 and against the biasing of the first bar biasing member 132 and the second bar biasing member 134, thereby allowing adjustment of the webbing 124. By releasing the quick release buckle 100, the first bar biasing member 132 and the second bar biasing member 134 may bias the bar 114 towards the engaging surface 120, thereby automatically locking the webbing 124 in a desired position or length selected by the user.

Figure 7B:
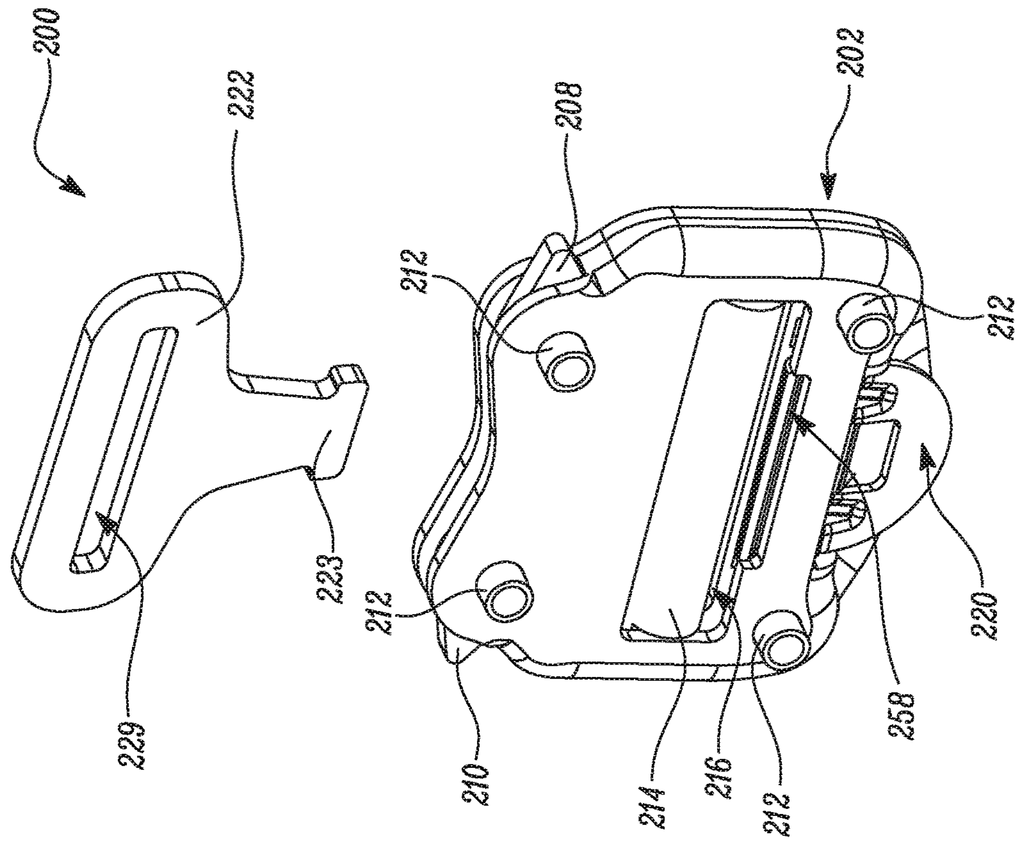
FIG. 7B is a schematic rear perspective view of the quick release buckle.
Figure 7A:
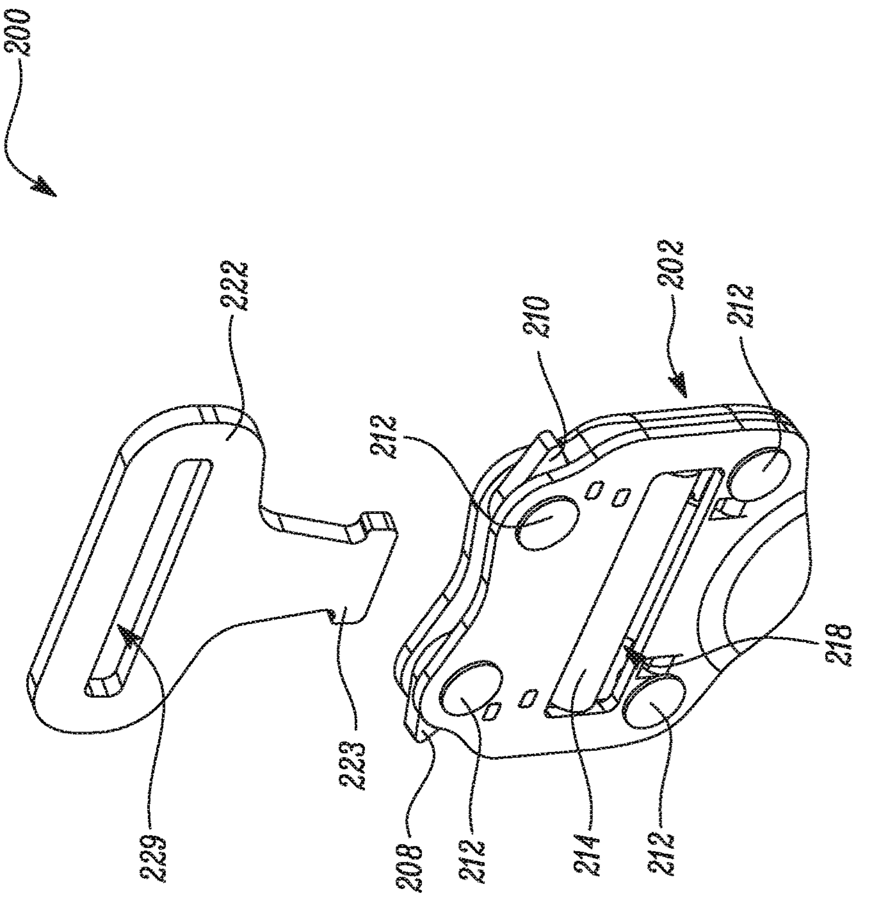
FIG. 7A is a schematic front perspective view of a quick release buckle according to one embodiment of the present disclosure.

Now referring to the FIGS. 7A and 7B, a quick release buckle 200 includes a housing 202, a first pawl 208, a second pawl 210, a bar 214, mechanical fasteners 212, and a catch 222. The first pawl 208 is pivotally mounted to the housing 202. Furthermore, the second pawl 210 is pivotally mounted to the housing 202. The first pawl 208 and the second pawl 210 may be pivotally mounted to the housing 202 by the respective mechanical fasteners 212. The catch 222 is at least partially received between the first pawl 208 and the second pawl 210. Specifically, the catch 222 may have an engaging portion 223 which is received between the first pawl 208 and the second pawl 210. The catch 222 may be coupled to a catch webbing (not shown) that is received through a slot 229 of the catch 222. The housing 202 defines a first opening 216 therethrough. The bar 214 is disposed within the housing 202 and extends across the first opening 216. A webbing 268 (shown in FIGS. 10A and 10B) is received through the first opening 216 of the housing 202. In some embodiments, the bar 214 may be knurled to increase its grip on the webbing 268. The webbing 268 may be at least partially disposed around the bar 214. In some embodiments, the bar 214 is fixedly connected to the housing 202, such that the bar 214 is stationary relative to the housing 202. In some other embodiments, the bar 214 may be slidably received across the first opening 216 of the housing 202.

The housing 202 may be formed by two or more parts. The two or more parts of the housing 202 may be fixedly connected using the mechanical fasteners 212. In the illustrated embodiment, the mechanical fasteners 212 are rivets. However, the mechanical fasteners 212 may be, for example, screws, bolts, and the like.

Figure 8:
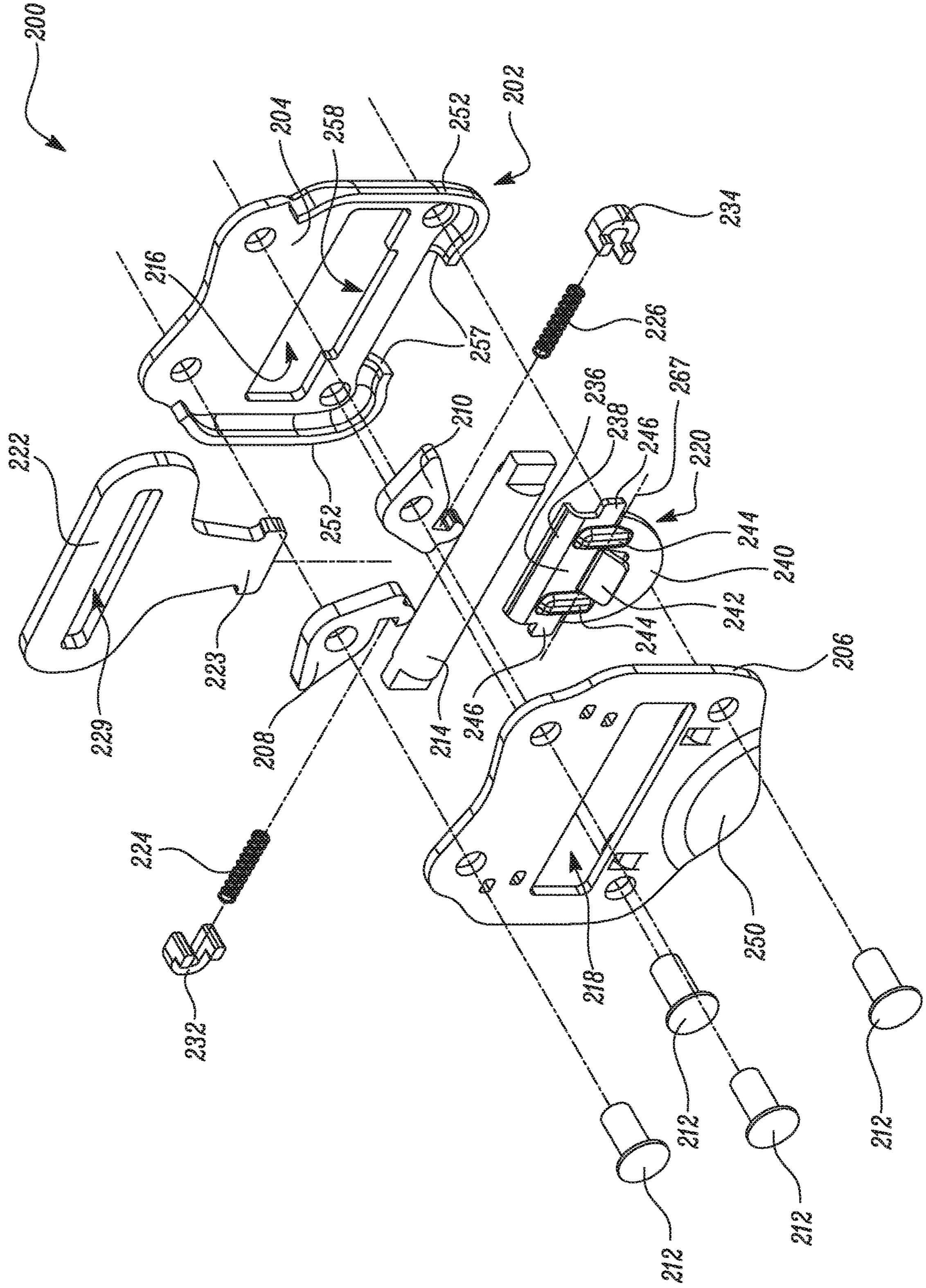
FIG. 8 is a schematic exploded front perspective view of the quick release buckle.

FIG. 8 illustrates an exploded front perspective view of the quick release buckle 200. As illustrated, the housing 202 includes a first housing part 204 and a second housing part 206. In other words, the first housing part 204 and the second housing part 206 may together form the housing 202. The first housing part 204 and the second housing part 206 of the housing 202 may be fixedly connected using the mechanical fasteners 212. Hereinafter, the first housing part 204 and the second housing part 206 may be collectively referred to as the housing 202.

The first housing part 204 defines the first opening 216 therethrough and the second housing part 206 is connected to the first housing part 204. The second housing part 206 defines a second opening 218 therethrough aligned with the first opening 216, such that the webbing 268 (shown in FIGS. 10A and 10B) is received through the second opening 218. In some embodiments, at least a portion of the bar 214 may extend through the first opening 216 and the second opening 218.

The quick release buckle 200 further includes a pair of biasing members, namely a first biasing member 224 and a second biasing member 226. The first biasing member 224 is engaged with the first pawl 208 and is configured to bias the first pawl 208 into engagement with the catch 222. The second biasing member 226 is engaged with the second pawl 210 and is configured to bias the second pawl 210 into engagement with the catch 222. In the illustrated embodiment, each of the first biasing member 224 and the second biasing member 226 is a coil spring. However, the first biasing member 224 and the second biasing member 226 may be any suitable biasing members, for example, magnets. In the illustrated embodiment, the quick release buckle 200 further includes a pair of elements, namely, a first element 232 and a second element 234. The first element 232 may be configured to engage with the first biasing member 224 and received in the first housing part 204. At least a portion of the first biasing member 224 may be disposed within the first element 232. Furthermore, the second element 234 may be configured to engage with the second biasing member 226 and received in the first housing part 204. At least a portion of the second biasing member 226 may be disposed within the second element 234.

The quick release buckle 200 further includes a lever 220. The lever 220 is at least partially received within the housing 202 and movable between a first position 228 and a second position 230 (shown in FIGS. 10A and 10B, respectively). The lever 220 includes an integral spring portion 242 engaged with the housing 202. The spring portion 242 is configured to bias the lever 220 toward the first position 228, such that the webbing 268 (shown in FIGS. 10A and 10B) is gripped between the lever 220 and the bar 214 in the first position 228 of lever 220 and the webbing 268 is allowed to move relative to the bar 214 in the second position 230 of the lever 220. The lever 220 further includes a main portion 236, a locking portion 238, and a tab portion 240. In the illustrated embodiment, the main portion 236 is substantially planar. The main portion 236 may be of any suitable planar shape. Further, the tab portion 240 is substantially planar. The tab portion 240 may be of any suitable planar shape. Further, the spring portion 242 is substantially planar. The spring portion 242 may be of any suitable planar shape, for example, rectangular. Furthermore, the locking portion 238 is curved. As illustrated, the housing 202 further includes a gripping portion 250 spaced apart from the tab portion 240. The gripping portion 250 includes a depression 251 (shown in FIG. 9) configured to engage with the spring portion 242.

The lever 220 further includes a pair of protrusions 246 extending from opposing lateral ends of the main portion 236. The housing 202 further includes a peripheral wall 252. In the illustrated embodiment, the first housing part 204 includes the peripheral wall 252. The protrusions 246 are configured to engage with the peripheral wall 252 to retain the lever 220 within the housing 202. In the illustrated embodiment, the lever 220 further includes a pair of raised portions 244 extending from the main portion 236 and the tab portion 240. The pair of raised portions 244 engage with the housing 202. Specifically, the pair of raised portions 244 may engage with the second housing part 206 of the housing 202.

Figure 9:
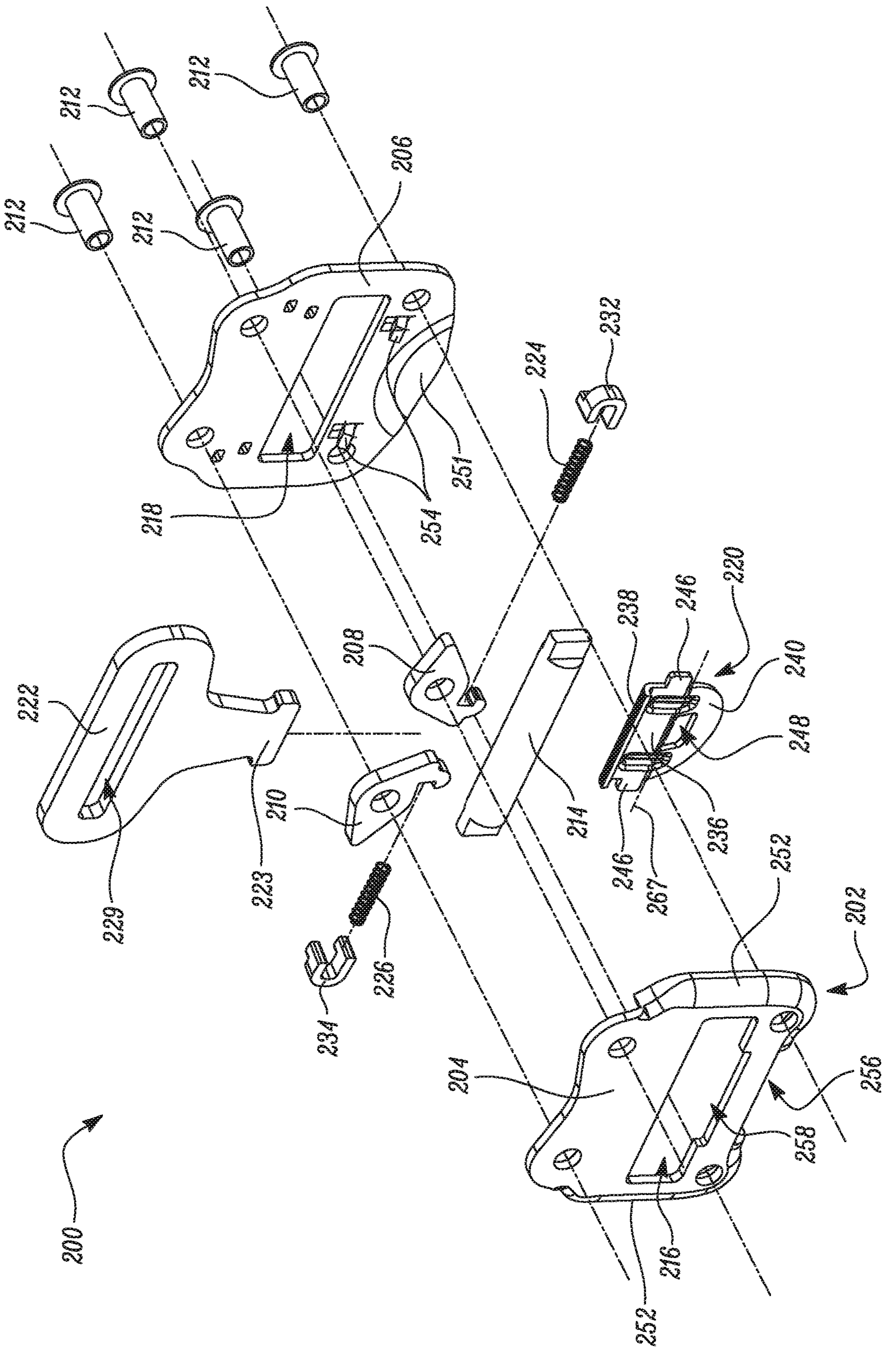
FIG. 9 is a schematic exploded rear perspective view of the quick release buckle.

FIG. 9 illustrates an exploded rear view of the quick release buckle 200. Referring to FIGS. 8 and 9, the first housing part 204 may include a structure to receive various components, and the second housing part 206 may function as a cover to the first housing part 204. The peripheral wall 252 of the first housing part 204 may abut the second housing part 206 to enclose various components of the quick release buckle 200. As illustrated, the first pawl 208 and the second pawl 210 may be pivotally coupled by the mechanical fasteners 212, and received in the first housing part 204. Furthermore, the first biasing member 224 and the second biasing member 226, along with the first element 232 and the second element 234 may also be received in the first housing part 204.

The housing 202 includes a pair of inclined stops 254 extending toward the lever 220 and spaced apart from the peripheral wall 252. Specifically, the second housing part 206 includes the pair of inclined stops 254. Each protrusion 246 is configured to engage a respective inclined stop 254 from the pair of inclined stops 254 to limit translation movement of the lever 220, relative to the housing 202, toward the bar 214.

The housing 202 further defines an outer opening 256 between opposing ends 257 (shown in FIG. 8) of the peripheral wall 252. Specifically, the first housing part 204 defines the outer opening 256. The tab portion 240 extends at least partially through the outer opening 256. The tab portion 240 further defines an aperture 248 therethrough. The spring portion 242 (see FIG. 8) is at least partially disposed in the aperture 248. The housing 202 further defines a cutout 258 communicating with the first opening 216. The locking portion 238 is at least partially received within the cutout 258.

Figure 10A:
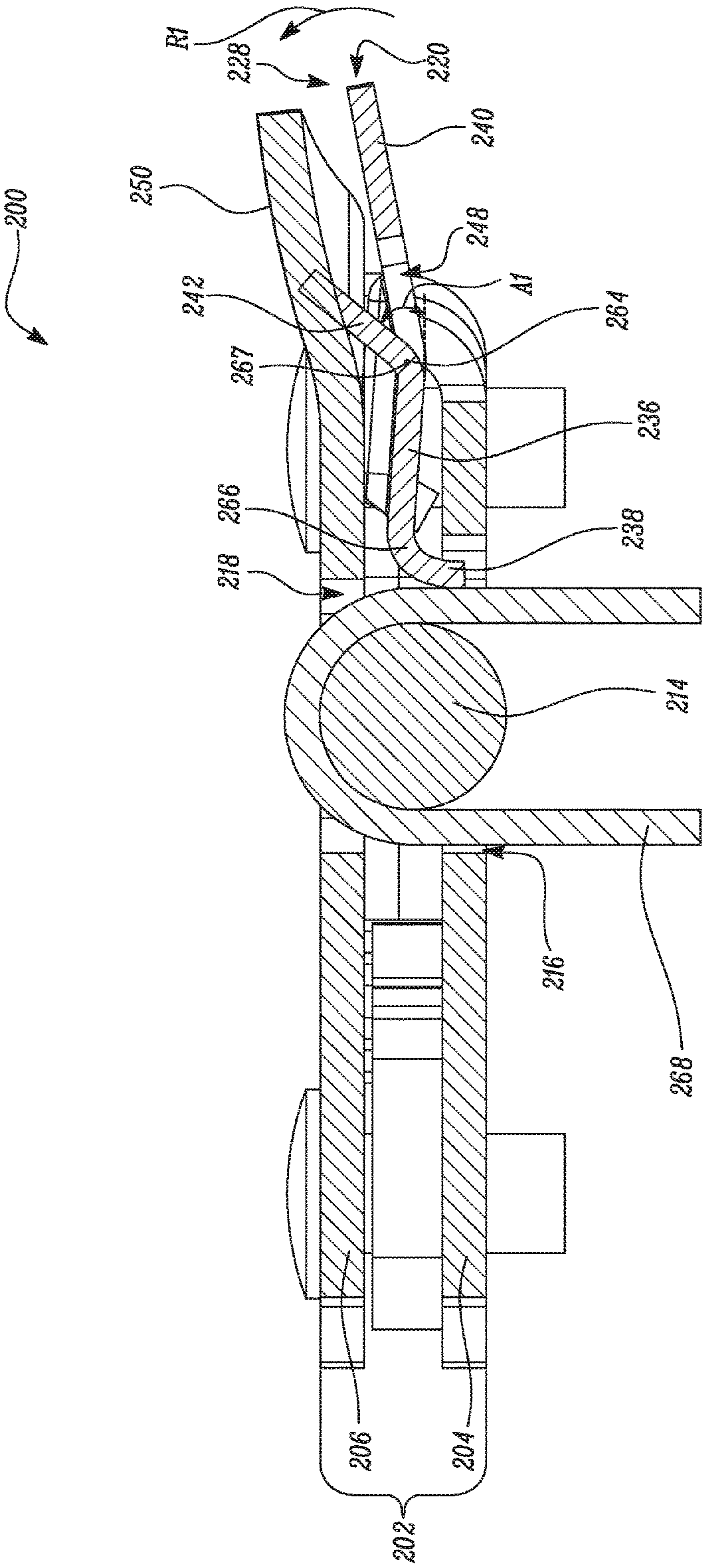
FIGS. 10A and 10B are schematic sectional side views of the quick release buckle illustrating a first position and a second position, respectively, of a lever of the quick release buckle.
Figure 10B:
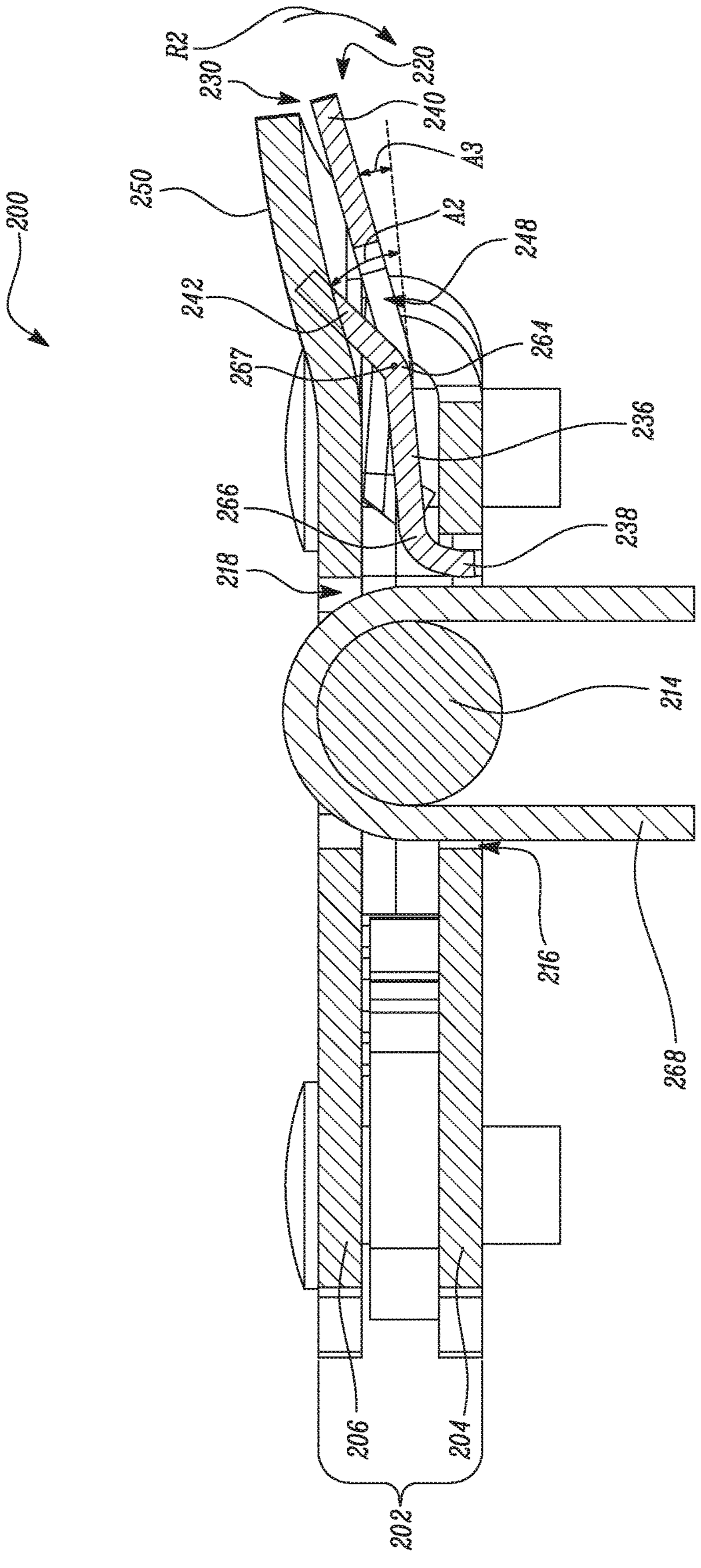

Now referring to FIGS. 10A and 10B, sectional side views of the quick release buckle 200 are illustrated. The webbing 268 is also partially illustrated. In FIG. 10A, the lever 220 is in the first position 228, and the webbing 268 is gripped between the lever 220 and the bar 214. In FIG. 10B, the lever 220 is in the second position 230, and the webbing 268 is allowed to move relative to the bar 214.

Referring to FIGS. 7-9, 10A and 10B, the main portion 236 is coupled to the housing 202 and includes a first end 264 and an opposing second end 266. The spring portion 242 extends from the first end 264 of the main portion 236. The locking portion 238 extends from the second end 266 of the main portion 236. The locking portion 238 is configured to engage the webbing 268 in the first position 228 of the lever 220.

The tab portion 240 extends from the first end 264 of the main portion 236, opposite to the locking portion 238. The tab portion 240 extends at least partially outside the housing 202 and is configured to be gripped by a user. Upon application of a force on the tab portion 240, the main portion 236 is configured to rotate relative to the spring portion 242 about a rotational axis 267 (best shown in FIG. 8) disposed along the first end 264 of the main portion 236. The first end 264 may form an interface between the main portion 236 and the spring portion 242 and the rotation axis 267 may extend along the interface.

In the first position 228 (see FIG. 10A) of the lever 220, the spring portion 242 is inclined obliquely relative to the main portion 236 by a first angle A1. In the second position 230 (see FIG. 10B) of the lever 220, the spring portion 242 is inclined obliquely relative to the main portion 236 by a second angle A2. The second angle A2 is less than the first angle A1. Further, the tab portion 240 is inclined obliquely relative to the main portion 236 by a third angle A3. The third angle A3 is less than the second angle A2. The user may grip the gripping portion 250 and the tab portion 240 and push the tab portion 240 toward the gripping portion 250. This may rotate the main portion 236, the locking portion 238 and the tab portion 240 relative to the spring portion 242 and about the rotation axis 267 disposed along the first end 264. The main portion 236, the locking portion 238 and the tab portion 240 rotates in a first direction R1 to the second position 230. Due to the rotation in the direction R1, the locking portion 238 is spaced apart from the webbing 268 in the second position 230, thereby allowing the webbing 268 to be adjusted. If the user releases the tab portion 240, the biasing of the spring portion 242 may rotate the main portion 236, the locking portion 238 and the tab portion 240 in a second direction R2 back to the first position 228. The second direction R2 may be opposite to the first direction R1. The locking portion 238 may again engage or grip the webbing 268, thereby preventing any adjustment of the webbing 268.

Figure 11B:
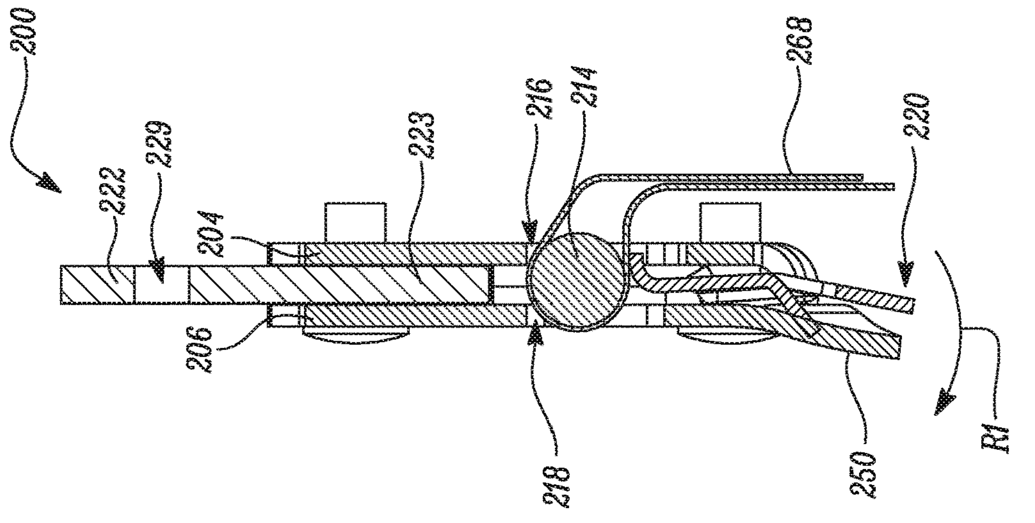
FIG. 11B is a schematic sectional side view of the quick release buckle.
Figure 11A:
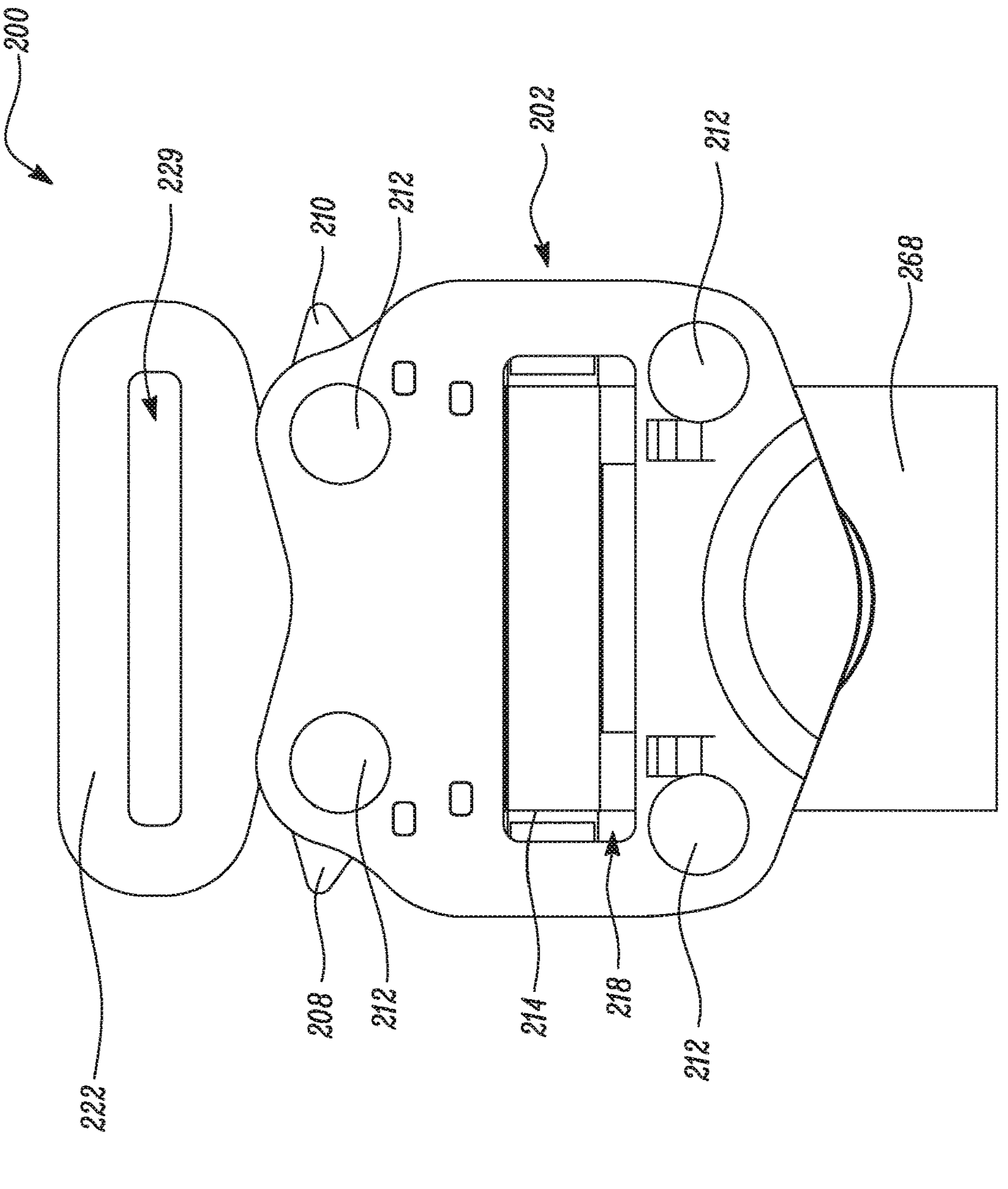
FIG. 11A is a schematic front view of the quick release buckle.

Referring to FIGS. 11A and 11B, assembled views of the quick release buckle 200 with the webbing 268 are illustrated. As illustrated, the webbing 268 is received through the first opening 216 of the housing 202. The catch 222 is at least partially received between the first pawl 208 and the second pawl 210. Specifically, the engaging portion 223 of the catch 222 may be received between the first pawl 208 and the second pawl 210. As illustrated in FIG. 11B, the housing 202 includes the first housing part 204 defining the first opening 216 therethrough and the second housing part 206 connected to the first housing part 204 and defining the second opening 218 therethrough. The second opening 218 is aligned with the first opening 216, such that the webbing 268 is received through the second opening 218.

Referring to FIGS. 10A, 10B, 11A and 11B, during use, a user may pull the lever 220 of the quick release buckle 200 in the first direction R1. The first direction R1 may be towards the second housing part 206 of the housing 202 of the quick release buckle 200. By pulling the lever 220 in the first direction R1, the lever 220 may move to the second position 230 from the first position 228 (see FIGS. 10A and 10B), thereby allowing adjustment of the webbing 268, i.e., the webbing 268 may be allowed to move relative to the bar 214 in the second position 230 of the lever 220. By releasing the lever 220, spring portion 242 may bias the lever 220 back toward the first position 228, such that the webbing 268 is gripped between the lever 220 and the bar 214, thereby automatically locking the webbing 268 in a desired position or length selected by the user.

Figure 12:
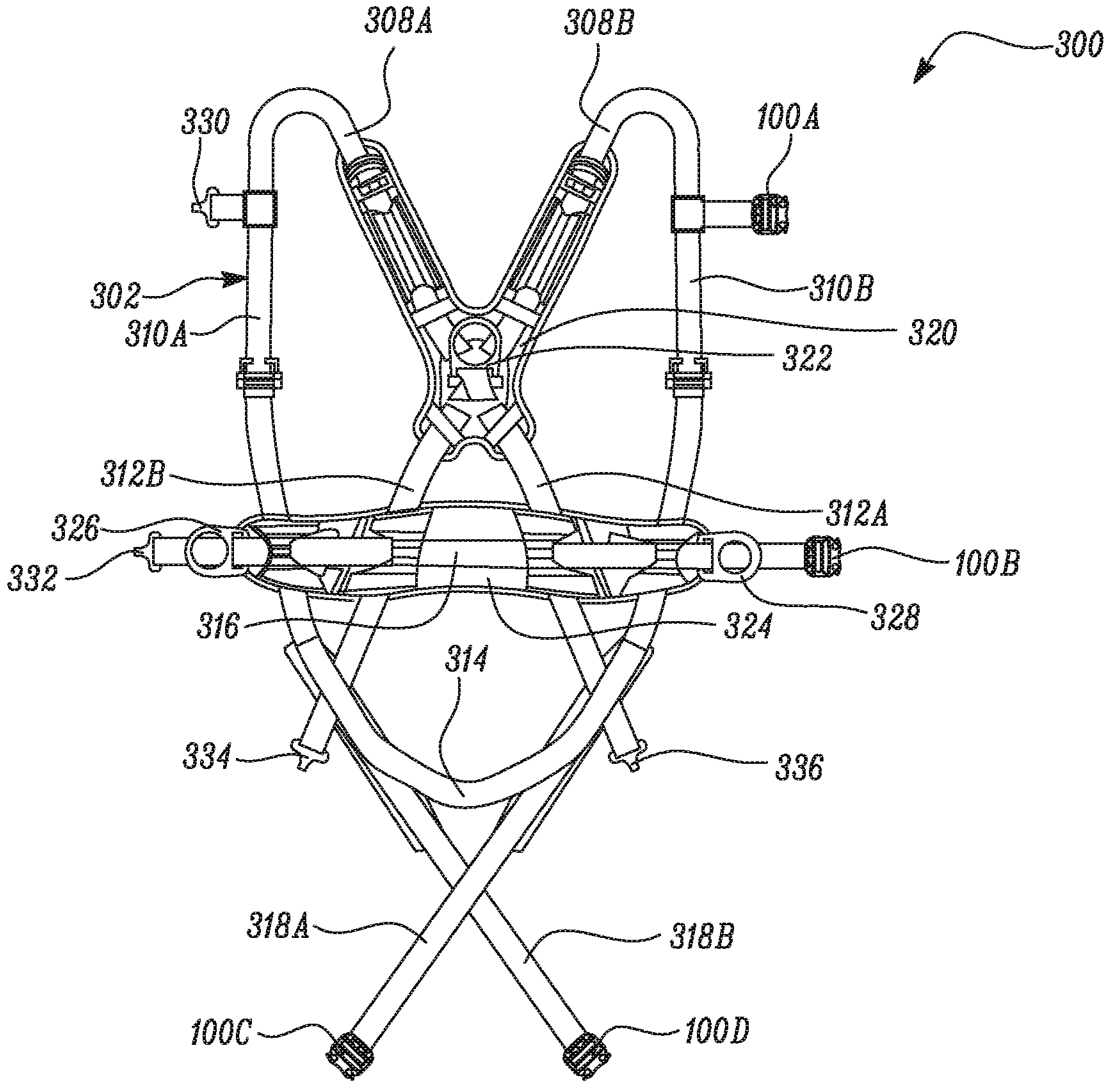
FIG. 12 is a schematic rear view of a harness according to one embodiment of the present disclosure.
Figure 13:
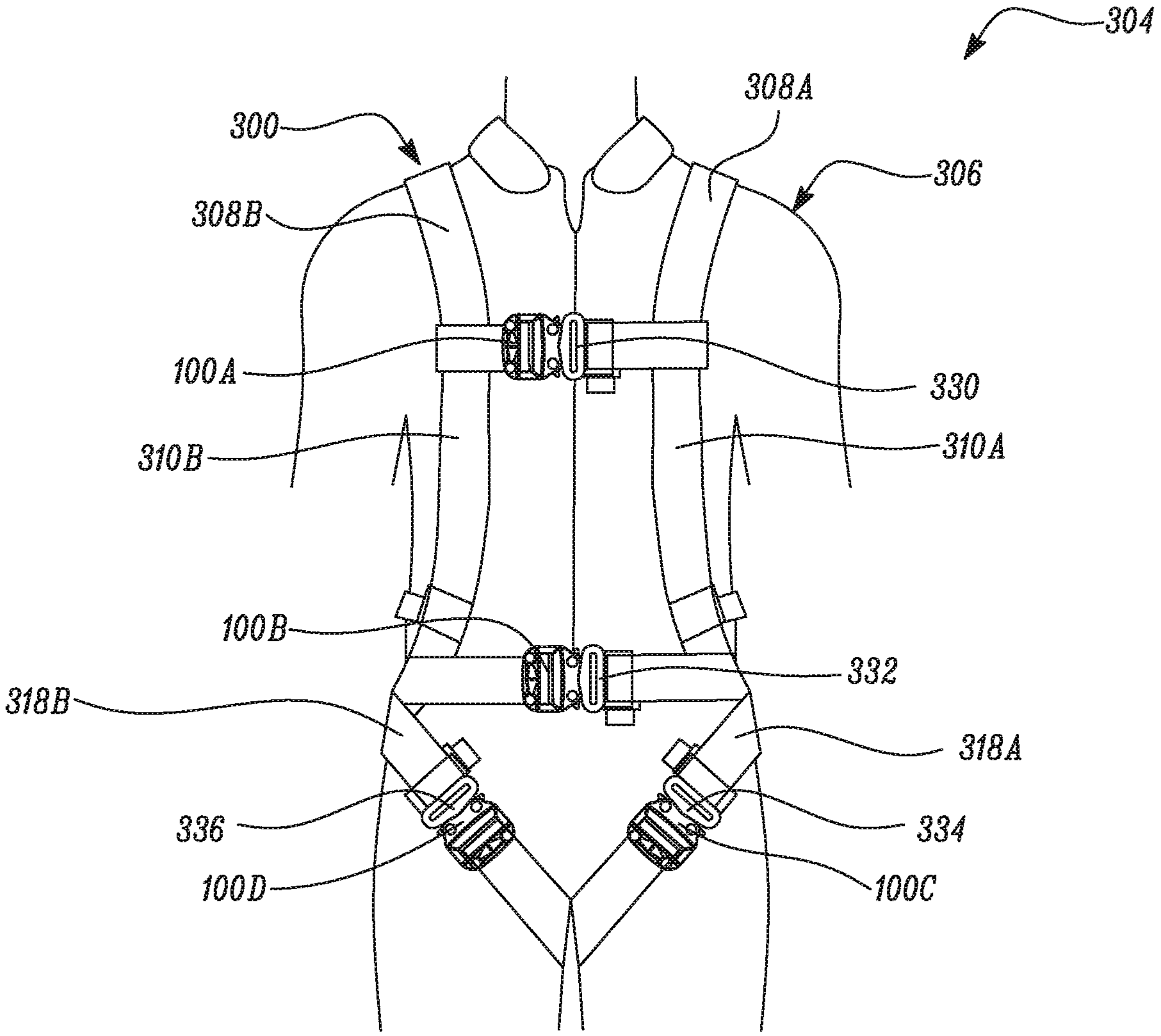
FIG. 13 is a schematic front view of the harness worn by a user.

Now referring to FIGS. 12 and 13, a harness 300 is illustrated. The harness 300 may be worn by a user 304. The harness 300 includes a webbing 302 configured to engage portions of a user's body 306. The harness 300 further includes the quick release buckle 100. Specifically, the harness 300 includes a plurality of quick release buckles 100, namely 100A, 100B, 100C and 100D. In some other embodiments, the harness 300 alternatively or additionally includes the quick release buckle 200. It may be noted that the webbing 124 of the quick release buckle 100 and the webbing 268 of the quick release buckle 200 discussed above may be replaced by the webbing 302 of the harness 300.

The webbing 302 includes a plurality of webbings that are secured around the user 304. In particular, the webbing 302 includes shoulder webbings 308A and 308B, front webbings 310A and 310B, back webbings 312A and 312B, a seat webbing 314, a hip webbing 316 and leg webbings 318A and 318B. A back pad 320 is also provided. A first D-ring 322 is coupled to the back pad 320 and the back webbings 312A and 312B. The first D-ring 322 may be used to couple the harness 300 to a support structure (not shown) via a lanyard or a lifeline (not shown). The hip webbing 316 may retain a hip pad 324 around a user's hip. A second D-ring 326 and a third D-ring 328 are attached to the hip webbing 316 and may be used to position the user 304 when in use. In the illustrated embodiment, the quick release buckle 100 described above is used to connect select webbings. In some other embodiments, the quick release buckle 200, also described above, is used to connect select webbings.

The quick release buckles 100A, 100B, 100C and 100D are similar to the quick release buckle 100, but are referred to with different reference numerals to distinguish between them. The harness 300 may include any number of the quick release buckle 100.

In particular, the quick release buckle 100A is selectively coupled to a catch 330 to attach the webbing across chest of the user. In other words, the webbing 302 is disposed proximate to a chest region of the user's body 306. The quick release buckle 100A fastens the webbing 302 around the chest region.

Similarly, the quick release buckle 100B is selectively coupled to a catch 332 to attach the webbing across waist of the user. In other words, the webbing 302 is disposed proximate to a waist region of the user's body 306. The quick release buckle 100B fastens the webbing 302 around the waist region.

The quick release buckles 100C and 100D are coupled to catches 334, 336, respectively, to strap the leg webbings 318A and 318B around legs of the user. In other words, the webbing 302 is disposed proximate to a leg region of the user's body 306. The quick release buckle 100C, 100D fastens the webbing 302 around the leg region.

Using the quick release buckles 100, 200 in the harness 300 may prevent unintentional loosening of the harness 300 over time. This may increase a safety of the harness 300 by preventing a potentially dangerous situation if a fall event occurs when the harness 300 is loose.

It will be appreciated that the arrangements presented herein may be varied in any number of aspects while still remaining within the scope of the disclosures herein.

A buckle as disclosed herein may satisfy certain strength tests; for example, the buckle, when tested with a suitable catch, may exhibit a tensile strength (in which a force is applied to separate the catch from the buckle) of at least 4000 pounds. The buckle may satisfy any applicable performance standard, e.g., ANSI, CSA, EN (CE), and so on.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. A quick release buckle comprising:

a housing defining a first opening therethrough and comprising an engaging surface disposed adjacent to the first opening;

a webbing received through the first opening of the housing;

a first pawl pivotally mounted to the housing;

a second pawl pivotally mounted to the housing;

a catch at least partially received between the first pawl and the second pawl;

a first pawl biasing member engaged with the first pawl and configured to bias the first pawl into engagement with the catch;

a second pawl biasing member engaged with the second pawl and configured to bias the second pawl into engagement with the catch;

a bar slidably received within the housing and extending across the first opening;

a first bar biasing member engaged with the bar; and a second bar biasing member engaged with the bar, wherein the first bar biasing member and the second bar biasing member are configured to bias the bar toward the engaging surface, such that the webbing is gripped between the bar and the engaging surface;

wherein the bar comprises a first extension and a second extension at opposing ends of the bar, wherein each of the first extension and the second extension is configured to slide relative to the housing, and wherein the first bar biasing member engage the first extension and the second bar biasing member engage the second extension;

wherein the housing further defines a first groove and a second groove opposing the first groove, and wherein the first extension is configured to slide along the first groove and the second extension is configured to slide along the second groove;

wherein the first bar biasing member is received in the first groove and the second bar biasing member is received in the second groove and, wherein:

the housing further comprises a first support surface, a first lateral surface extending from the first support surface, a second lateral surface extending from the first support surface and opposite to the first lateral surface, and a first end surface extending from the first support surface and connected to the first lateral surface and the second lateral surface;

the first support surface, the first lateral surface, the second lateral surface and the first end surface define the first groove;

a length of the first lateral surface is greater than a length of the second lateral surface, such that the first support surface slidably receives the first extension of the bar thereon; and the first bar biasing member engages with the first end surface and is at least partially received between the first lateral surface and the second lateral surface and, further wherein:

the housing comprises a first housing part defining the first opening therethrough and a second housing part connected to the first housing part and defining a second opening therethrough aligned with the first opening, such that the webbing is received through the second opening, with the first housing part comprising the first support surface, the first lateral surface, the second lateral surface, and the first end surface that define the first groove, with the second housing part comprising a cover surface that covers the first groove.

2. The quick release buckle according to claim 1, wherein the first opening is disposed between the first groove and the second groove.

3. A harness comprising the quick release buckle of claim 1.

4. The harness according to claim 3, wherein the webbing is disposed proximate to a chest region of the user's body, and wherein the quick release buckle fastens the webbing around the chest region.

5. The harness according to claim 3, wherein the webbing is disposed proximate to a waist region of the user's body, and wherein the quick release buckle fastens the webbing around the waist region.

6. The harness according to claim 3, wherein the webbing is disposed proximate to a leg region of the user's body, wherein the quick release buckle fastens the webbing around the leg region.

7. The quick release buckle according to claim 1, wherein each of the first extension and the second extension has a substantially planar surface configured to engage and slide relative to the housing.

8. The quick release buckle according to claim 1, wherein:

the housing further comprises a second support surface, a third lateral surface extending from the second support surface, a fourth lateral surface extending from the second support surface and opposite to the third lateral surface, and a second end surface extending from the second support surface and connected to the third lateral surface and the fourth lateral surface;

the second support surface, the third lateral surface, the fourth lateral surface and the second end surface at least partially define the second groove;

a length of the third lateral surface is greater than a length of the fourth lateral surface, such that the bar is disposed between the first lateral surface and the third lateral surface and the second support surface slidably receives the second extension of the bar thereon;

the second bar biasing member engages with the second end surface and is at least partially received between the third lateral surface and the fourth lateral surface; and the engaging surface is connected to and extends between the first lateral surface and the third lateral surface.

9. The quick release buckle according to claim 8, wherein the housing further comprises a stop surface opposite to the engaging surface, wherein the stop surface is connected to and extends between the second lateral surface and the fourth lateral surface, and wherein the first opening is further disposed between the engaging surface and the stop surface.

10. The quick release buckle according to claim 1, wherein each of the first bar biasing member and the second bar biasing member is a coil spring.

* * * * *